United States Patent [19]

Vander Mey

[11] 4,221,674

[45] Sep. 9, 1980

[54] ORGANIC SULFONIC ACID STRIPPING COMPOSITION AND METHOD WITH NITRILE AND FLUORIDE METAL CORROSION INHIBITOR SYSTEM

[75] Inventor: John E. Vander Mey, Stirling, N.J.

[73] Assignee: Allied Chemical Corporation, Morris Township, Morris County, N.J.

[21] Appl. No.: 18,980

[22] Filed: Mar. 9, 1979

Related U.S. Application Data

[63] Continuation-in-part of Ser. No. 915,640, Jun. 15, 1978, abandoned.

[51] Int. Cl.$^2$ .......................... C11D 3/43; B08B 3/08; C23G 5/02
[52] U.S. Cl. ..................................... 252/141; 134/3; 134/38; 134/41; 134/42; 252/142; 252/143; 252/148; 252/558
[58] Field of Search .............. 252/141, 142, 143, 148, 252/153, 171, 558, 79.3, 79.4, 390, 394; 134/3, 38, 40, 42, 41

[56] References Cited

U.S. PATENT DOCUMENTS

| | | | |
|---|---|---|---|
| 1,759,840 | 5/1930 | Cole et al. | 252/148 |
| 2,508,215 | 5/1950 | Bishop et al. | 252/141 |
| 3,335,088 | 8/1967 | Mandell | 252/143 |
| 3,862,250 | 1/1975 | Beckers | 252/394 X |
| 3,876,371 | 4/1975 | Costain et al. | 252/148 X |
| 3,932,130 | 1/1976 | Bennett et al. | 21/2.7 R |
| 4,070,203 | 1/1978 | Neisius et al. | 134/3 |

FOREIGN PATENT DOCUMENTS 734389  5/1966  Canada.

*Primary Examiner*—Harris A. Pitlick
*Attorney, Agent, or Firm*—Jay P. Friedenson; Alan M. Doernberg

[57] ABSTRACT

Improved organic stripping compositions useful in removing polymeric organic substances, such as photoresist, from metal substrates which comprise one or more organic sulfonic acids, one or more organic solvents and, optionally phenol. The inhibitors system includes 5 to 300 ppm by weight of fluoride per weight of composition and between about 0.01 and about 5 weight percent of a nitrile compound such as acetonitrile or malononitrile.

20 Claims, No Drawings

ORGANIC SULFONIC ACID STRIPPING COMPOSITION AND METHOD WITH NITRILE AND FLUORIDE METAL CORROSION INHIBITOR SYSTEM

This is a continuation-in-part of my application Ser. No. 915,640, filed June 15, 1978 now abandoned.

DESCRIPTION

BACKGROUND OF THE INVENTION

As described in my copending U.S. Pat. applications Ser. Nos. 873,340 (filed Jan. 30, 1978) and 729,515 (filed Oct. 4, 1976) now Pat. No. 4,165,295, organic stripping solutions including sulfonic acids are known in stripping agents for removing polymeric organic substances such as photoresists from metallized inorganic substrates. While such stripping agents are effective in removing the polymeric substances, they also have a tendency, especially in the presence of water, to corrode the metal, particularly aluminum and titanium. In my above two applications, I describe inhibitors for such stripping agents which reduce the metal corrosion rate. Such systems include fluoride, especially as hydrogen fluoride. It has now been found that nitrile compounds reduce the loss of fluoride through vaporization of HF, and also enhance the corrosion inhibition properties of the fluoride.

BRIEF DESCRIPTION OF THE INVENTION

In accordance with this invention, there are provided improved organic stripping compositions for removing polymeric organic substances from metallized inorganic substrates which include at least one organic sulfonic acid of the following formula:

wherein R is an organic radical selected from the group consisting of alkyl containing 1 to 18 carbon atoms, monohydroxyalkyl containing 1 to 18 carbon atoms, aryl containing 6 to 10 carbon atoms, monoalkyl aryl wherein the alkyl group contains 1 to 14 carbon atoms, dialkyl aryl wherein each alkyl group contains 1 to 4 carbon atoms, monohydroxy aryl containing 6 to 10 carbon atoms, monoalkyhydroxy aryl containing 7 to 11 carbon atoms, and monochlorohydroxy aryl containing 6 to 10 carbon atoms, at least one organic solvent, optionally phenol and an inhibitor system including about 5 to about 300 ppm fluoride by weight of composition. In the improvement the inhibitor system also includes about 0.01 to about 5 percent by weight of composition of a nitrile compound of the formula H—R—CN or of the formula NC—R—CN, where R is alkylene, arylene or alkylarylene. Such nitrile compounds reduce the loss of fluoride inhibitor through vaporization of HF and also enhance the inhibition of metal corrosion by the fluoride.

DETAILED DESCRIPTION OF THE INVENTION

The organic stripping compositions of this invention include those which contain as the main stripping agents one or more organic sulfonic acids which possess the property of being able to dissolve and disperse polymeric organic substances away from an inorganic substrate. Among the various classes of organic sulfonic acids which possess this property and are useful in the present invention are the alkyl-, monohydroxyalkyl-, aryl-, monoalkylaryl-, dialkylaryl-, monohydroxyaryl-, monoalkyl-, hydroxyaryl- and monochloro-hydroxyarylsulfonic acids.

Examples of alkyl sulfonic acids are those containing 1 to 18 carbon atoms, preferably linear alkyl sulfonic acids containing 10, 12 or 14 carbon atoms, such as linear dodecanesulfonic acid and linear decanesulfonic acid.

Examples of monohydroxyalkyl sulfonic acids are those containing 1 to 18 carbon atoms, preferably containing 15 to 18 carbons, in a linear or branched chain such as those produced by sulfonation of alpha-olefins. An example is the monohydroxy sulfonic acid mixture produced from the sulfonation of 1-octadecene.

Examples of arylsulfonic acids are those containing 6 to 10 carbon atoms and include naphthalene sulfonic acids, and preferably benzenesulfonic acid.

Examples of monoalkylarylsulfonic acids are those containing an alkyl group composed of 1 to 14 carbon atoms, which may be linear or branched such as toluenesulfonic acid, cumene-sulfonic acid, decylbenzenesulfonic acid and dodecylbenzenesulfonic acid. Preferred among the monoalkylarylsulfonic acids are linear monoalkylbenzenesulfonic acids because of greater biodegradability such as toluene-sulfonic acid (usually the para isomer predominates, but either isomer may be used), linear octyl-, decyl- and dodecylbenzenesulfonic acid.

Examples of dialkylarylsulfonic acids are those containing two alkyl groups each preferably linear and composed of 1 to 4 carbon atoms and include the isomers of xylenesulfonic acid and the isomers of methylethylbenzene sulfonic acid. Preferred are the isomers of xylenesulfonic acid either individually or in admixture.

Examples of monohydroxyarylsulfonic acids are those containing 6 to 10 carbon atoms and include the naphtholsulfonic acids and the phenolsulfonic acids. Preferred sulfonic acids in this group are the phenolsulfonic acids, either the ortho or para isomers, individually or in admixture.

Examples of monoalkyl-hydroxyarylsulfonic acids are those containing 7 to 11 carbon atoms and include methylnaphtholsulfonic acids and cresolsulfonic acids. A preferred example is cresolsulfonic acid, including all of its isomers either individually or in admixture.

Examples of monochloro-hydroxyarylsulfonic acids are those containing 6 to 10 carbon atoms and include chloronaphtholsulfonic acids and chlorophenolsulfonic acids. Preferred in this group are the chlorophenolsulfonic acids, including all of its isomers either individually or in admixture.

The compositions of this invention may contain one or more of the above-mentioned organic sulfonic acids, but it is preferred to use at least two organic sulfonic acids in combination which contain different R groups as defined above to maximize the stripping ability of the composition to remove polymeric organic substances. If only one organic sulfonic acid is used, it is preferred to use linear dodecylbenzenesulfonic acid in the composition because of its superior properties as a stripping agent, and its ready availability and low cost as contrasted to other organic sulfonic acids. When two or more organic sulfonic acids are used, it is preferred to use the combination of linear dodecylbenzenesulfonic acid/para-toluenesulfonic acid, or, if phenol is additionally used in the composition, then phenolsulfonic acid is preferably used in combination with linear dodecylbenzenesulfonic acid. Benzenesulfonic acid is also preferred, especially with compositions free of phenol and free of chlorinated hydrocarbons.

The organic sulfonic acid, used either singly or in admixture, is generally present in the composition in the range of about 20 to 80 weight percent of the composition in the absence of phenol, and preferably about 30 to 60 weight percent. If used in combination with phenol, the sulfonic acid is generally used in the range of about 10 to 80 weight percent with the phenol comprising about 5 to 50 weight percent of the composition. The balance is mainly solvent. In certain compositions with mixtures of sulfonic acids, less than 20 weight percent or even no solvent may be used such that the sulfonic acids may comprise over 80 and up to substantially 100 percent of the composition exclusive of inhibitors.

The solvents which are useful in the compositions of the present invention, either in the absence or in combination with phenol, are selected from the group consisting of aromatic hydrocarbons containing 6 to 14 carbon atoms, of which benzene and naphthalene are examples; aliphatic hydrocarbons containing 6 to 30 carbon atoms, of which dodecane, a mixture of isoparaffinic hydrocarbons with an average molecular weight between 150 and 210 and a boiling point between 160° and 220° C., and light and heavy mineral oils from the distillation of petroleum are examples; monoalkylsubstituted aromatic hydrocarbons containing 7 to 20 carbon atoms, of which the linear alkylbenzenes are preferred such as toluene, ethylbenzene, cumene, octylbenzene, decylbenzene and dodecylbenzene; dialkyl-substituted aromatic hydrocarbons containing 8 to 20 carbon atoms, of which the dialkylbenzenes such as the ortho, meta and para isomers of xylene and diethylbenzene are examples; trialkyl-substituted aromatic hydrocarbons containing 9 to 20 carbon atoms, of which the trialkylbenzenes such as 1,2,3-, 1,2,4- and 1,3,5-isomers of trimethyl- and triethylbenzene are examples; chlorinated aliphatic hydrocarbons containing 1 to 14 carbon atoms and 1 to 4 chlorine atoms, of which methylene chloride and tetrachloroethane are examples; chlorinated olefinic hydrocarbons containing 1 to 14 carbon atoms and 1 to 4 chlorine atoms of which those containing 2 to 4 carbon atoms and 3 to 4 chlorine atoms are preferred such as trichloroethylene and perchloroethylene (tetrachloroethylene); chlorinated aromatic hydrocarbons containing 6 to 12 carbon atoms and 1 to 4 chlorine atoms, of which the chlorinated benzenes containing 1 to 3 chlorine atoms are preferred such as orthodichlorobenzene and trichlorobenzene; aliphatic ketones containing 3 to 10 carbon atoms, of which acetone and methylethylketone and methylisobutylketone are examples; monoalkylethers of ethylene glycol containing 3 to 10 carbon atoms, of which ethoxyethanol and butoxyethanol are examples; carboxylic acids containing 1 to 4 carbon atoms, of which acetic, maleic, and trichloroacetic acids are examples; cresols containing 7 to 10 carbon atoms, of which meta- and paracresol are examples; hydroxybenzenes containing 2 to 3 hydroxy groups, of which resorcinol and hydroquinone are examples; formamide; N,N-dialkylalkanoylamides containing 3 to 10 carbon atoms, of which dimethylformamide and dimethylacetamide are examples; N-alkyl lactams containing 6 to 12 carbon atoms, of which N-methylpyrrolidone is an example and cyclic aliphatic sulfones containing 4 to 6 carbon atoms, of which tetramethylenesulfone is an example. It should be appreciated that some of these solvents may also complex with the hydrogen fluoride complex.

The solvents which are preferred for use either individually or in combination in the invention are the aliphatic hydrocarbons, preferably a mixture of isoparaffinic hydrocarbons with an average molecular weight between 150 and 210 and a boiling point between 160° and 220° C. and light and heavy mineral oils produced from the distillation of petroleum, the chlorinated olefinic hydrocarbons, preferably perchloroethylene, the chlorinated aromatic hydrocarbons, preferably orthodichlorobenzene, the monoalkyl-substituted aromatic hydrocarbons, preferably octylbenzene, decylbenzene or dodecylbenzene, the dialkyl-substituted aromatic hydrocarbons, preferably the individual isomers or mixtures thereof of xylene and diethylbenzene, respectively, and the trialkyl-substituted aromatic hydrocarbons, preferably the isomers of trimethylbenzene or mixtures thereof.

The solvent or solvent mixture employed in the organic composition of this invention is generally present in an amount of about 20 to 90 weight percent, preferably 30 to 70 weight percent, of the composition. With certain combinations of sulfonic acids such as equal parts of dodecylbenzenesulfonic acid and benzenesulfonic acid, little or no solvent may be required.

The compositions of the present invention possess an important advantage over prior art organic compositions in that they contain only small amounts of fluoride ion which have surprisingly been found to inhibit the dulling and corrosion of metals, particularly aluminum, without causing substantial etching of the inorganic substrates, such as silicon, silicon dioxide and sapphire, particularly silicon dioxide, when subjected to the action of the stripping composition at a temperature of about 20° to 180° C., even after repeated use at such elevated temperatures. By the term "substantial etching" is meant an etch rate greater than about 0.2 Å/minute of the thickness of an inorganic wafer, particularly silicon dioxide.

As indicated in the brief description, the present invention includes an inhibitor system of both a fluoride and nitrile compound. These two ingredients may be mixed together with or without reaction therebetween before addition to the rest of the stripping agent. Alternatively, the fluoride and the nitrile may be added separately to the stripping agent. Fluoride may be added in various forms, including HF and various inorganic salts such as ammonium bifluoride or ammonium fluoborate. It is believed, however, that such fluoride normally is converted in the acidic stripping composition to HF.

The fluoride is normally introduced into the composition in a range of about 5 to 300 parts per million (ppm) by weight of the composition, a preferred range being between about 100 and about 250 ppm by weight, and a more preferred range being between about 150 and about 250 ppm by weight. As indicated above, significantly higher amounts of fluoride tend to cause substantial etching of the inorganic substrates.

For many compositions, however, use as a stripping agent at elevated temperatures causes the fluoride concentration to fall below 50 ppm and stabilize at levels of 25, 20, 10 or even 5 ppm. The nitriles of the present invention as described below, are generally effective in preventing the fluoride from falling below about 20 ppm and may keep the fluoride concentration above 50 ppm in some uses. Nevertheless, it is desirable that the nitrile be effective in combination with 10 to 25 ppm fluoride to inhibit metal (and especially aluminum) corrosion.

In the present invention the inhibitor system includes, in addition to the fluoride, a nitrile compound present at levels of between about 0.01 and about 5 weight percent of the total composition, with about 0.05 to about 1 weight percent being preferred and about 0.1 to about 0.3 weight percent being more preferred for general application.

Particularly for applications in which the stripper acts on positive photoresist, levels at the lower end of the above range are preferred. Thus for such strippers, the preferred nitrile level is between about 0.01 and about 0.5 weight percent and the more preferred range is between about 0.05 and about 0.3.

Suitable nitrile compounds include the mononitriles and dinitriles discussed below. Suitable mononitriles are of the formula H—RCN where R is alkylene (preferably of 1 to 8 carbons), arylene (preferably benzene) or alkylarylene (preferably of 7 to 12 carbons). Larger R groups than those indicated as preferred may have decreased solubility, have a tendency to leave a residue on the substrate, contribute fewer nitrile groups compared to the weight of material added or otherwise be less suitable than the preferred smaller molecules. Preferred mononitriles are acetonitrile, propionitrile and isobutyronitrile.

Dinitriles are also suitable for use in the present invention. Such dinitriles are of the formula NC—R—CN where R is alkylene (preferably of 1 to 8 carbons), arylene (preferably benzene) or alkylarylene (preferably of 7 to 12 carbons). By alkylarylene is meant aryl with one or more alkyl side chains and the two CN groups bonded either to the aryl, to the alkyl, or one to the aryl and one to the alkyl. Dinitriles with R groups larger than those indicated as preferred are less preferred for the reasons given above in relation to larger mononitriles. Polynitriles with more than 2 CN groups are not included because of either unavailability or excessive costs. Preferred dinitriles are malonitrile (NC—CH$_2$—CN), succinonitrile (NC—CH$_2$CH$_2$—CN), glutaronitrile (NC—(CH$_2$)$_3$—CN), adiponitrile (NC—(CH$_2$)$_4$—CN) and phthalonitrile.

Nitriles corresponding to ethylenically unsaturated acids (i.e. maleic acid) or to oxalic acid (HOOC—COOH) are not contemplated because of toxicity or stability considerations.

In all of the definitions of R, above, the term "alkyl" or "alkylene" is used in its usual sense to include both linear and branched structures.

The inhibitor system of the present invention is particularly effective with non-phenolic strippers of the type containing a large proportion of sulfonic acids. Such strippers are described in my copending United States patent applications Ser. Nos. 740,154 (filed Nov. 8, 1976) and 908,189 (filed May 22, 1978) now U.S. Pat. No. 4,165,294. Exemplary chlorinated hydrocarbon-containing non-phenolic strippers contain linear dodecylbenzene sulfonic acid, para-toluene sulfonic acid, alkylbenzenes such as dodecylbenzene, perchloroethylene and orthodichloro benzene. Exemplary proportions would be 32, 10, 28, 20 and 8% of these five ingredients. To such a composition fluoride may be added at, for example, 150 ppm by weight of fluoride ion in the form of HF. The nitrile, such as acetonitrile, may then be added in quantities sufficient to provide about 0.2 weight percent acetonitrile by weight of composition. It will be appreciated that the amounts of fluoride and acetonitrile are small enough not to have any appreciable affect upon the concentrations of the five other ingredients.

An exemplary composition free of both phenol and chlorinated hydrocarbon compounds is one containing about 45 weight percent benzene sulfonic acid, 45 weight percent dodecylbenzene sulfonic acid and 10 weight percent alkyl benzenes such as dodecylbenzene. Fluoride may be provided to such a composition at, for example, 200 ppm, and acetonitrile at, for example, 0.1 percent by weight. An alternative formulation of this type is one containing 50-55% dodecylbenzenesulfonic acid, 30-35% benzenesulfonic acid and 4-6% dodecylbenzene, all by weight. To this composition would be added HF to give a fluoride concentration of about 200 ppm by weight and acetonitrile, malonitrile or adiponitrile to a concentration of 0.1% or 0.2% by weight.

It should be appreciated that other useful combinations of organic sulfonic acids and organic solvents in various proportions beyond those specifically discussed above would be obvious to one skilled in the art form from a reading of my above-referenced copending applications and the prior art.

Not only are the compositions of the organic strippers an object of this invention, but also the method of using the organic compositions of this invention.

Normally, the compositions will be utilized in removing a polymeric organic substance such as a photoresist agent from the surface of an aluminized inorganic substrate by immersing the substrate into the stripping solution at a temperature of about 20° to 180° C. Normally, the surface of the inorganic substrate which is either silicon, sapphire or silicon dioxide will be metalized with aluminum or titanium as is common in the area of photoresist applications used in the semi-conductor industry. Other common metals include molybdenum, tungsten and nickel-chrome alloys.

Typically, the photoresists which are commonly removed by the compositions of this invention are of the polyisoprene, polyvinyl cinnamate, and phenol-formaldehyde types as well as other types of polymeric organic substrates. These photoresists are applied to a substrate, e.g. silicon dioxide, silicon or aluminum, and portions of the material are then masked. A typical such substrate is silicon with a silicon dioxide surface coating covered by a thin aluminum layer. The masked substrate is then exposed to light, e.g., a 120 volt 650 watt quartz lamp for 1 to 15 seconds at a distance of 6 to 12 inches to harden the exposed photoresist. Other exposure means such as election beams are also used for this purpose. With negative photoresists, the portion of the photoresist which is not exposed, i.e., masked from the light, is then removed by a mild solvent which does not dissolve the exposed photoresist thus leaving a pattern, e.g. a portion of an electrical circuit pattern, on the exposed substrate. In the case of positive photoresists, it is the exposed portion that is removed by a mild solvent. The remaining photoresist is then baked for further hardening and the portion of the substrate which is not covered by the photoresist is etched or otherwise treated. The hardened photoresist must then be removed before the substrate can be further processed or used. In employing the stripping compositions of this invention, the substrate covered with the baked photoresist is contacted with the stripping solution at a temperature of about 20° to about 180° C., preferably between 90° and 120° C.

Times required for stripping the photoresist vary to quite an extent, depending on the specific polymer used in the photoresist and photoresist processing conditions. Generally, the time involved will be between 1 and 10 minutes although some resists, depending upon the bake temperature, may require 15 minutes, 30 minutes or even an hour of contact with the stripping solution before the polymeric photoresist is loosened from the substrate, depending upon the degree of polymerization of the exposed photoresist and the thickness of the formed polymer. After the photoresist has been removed, the substrate is washed with a suitable solvent such as water, alcohol, or chlorinated hydrocarbon such as perchloroethylene to remove traces of the composition before drying.

The following examples are given for illustrative purposes only and are not to be construed as limitations upon the scope of the disclosed invention.

EXAMPLES 1-10

A nonphenolic stripper was prepared from 51 weight % dodecylbenzenesulfonic acid (from Stepan Chemical Co., contains a carbon distribution of about 18% C-16, 38% C-17, 33% C-18 and 10% C-19 and contains about 2.0% free hydrocarbon and 0.5% free sulfuric acid), 20 weight % benzenesulfonic acid (from Jim Walters Associates, contains about 1.0% free sulfuric acid) and 29 weight % dodecylbenzene (from Continental Oil Co., same carbon distribution as the dodecylbenzenesulfonic acid). This composition was determined by azeotropic disillation with xylene to contain about 0.75 weight % water.

Test tubes were prepared with the above composition to which was added HF (as a 50:50 mixture with water) and/or the nitrile compound shown in Table 1 to the respective levels shown in Table 1. Aluminum foil pieces 3 inch × 1 inch × 0.002 inch were weighed on an analytical balance and placed one in each test tube. The tubes were covered and kept at 100° C. for 20 hours. Then the foil pieces were rinsed, dried and reweighed on an analytical balance. From the difference in weight, an aluminum corrosion rate in angstroms per minute was calculated. The results are displayed in Table 1.

TABLE 1

Aluminum Corrosion Test
Composition of 51% DDBSA, 20% BSA, 29% DDB

| Example No. | HF ppm | Nitrile | % | Aluminum Corrosion A°/min |
|---|---|---|---|---|
| 1 | 5 | None | — | 74 |
| 2 | 5 | AN | 0.7 | 42 |
| 3 | 5 | AN | 1.0 | 39 |
| 4 | 175 | AN | 0.2 | 0.3 |
| 5 | 0 | AN | 2.0 | 0.1 |
| 6 | 5 | MN | 0.7 | 9 |
| 7 | 5 | MN | 1.0 | 0.5 |
| 8 | 175 | MN | 0.2 | 0.1 |
| 9 | 5 | GN | 0.7 | 37 |
| 10 | 5 | SN | 0.7 | 36 |

AN = Acetonitrile
MN = Malononitrile
GN = Glutaronitrile
SN = Succinonitrile
BN = Benzonitrile

EXAMPLES 11-29

Examples 1-10 were repeated using a stripper of 50 weight % dodecylbenzenesulfonic acid, 34 weight % benzenesulfonic acid and 12 weight % dodecylbenzene (each as in Examples 1-10) and 4 weight % toluenesulfonic acid (from Jim Walters Associates, contains about 1.0% free sulfuric acid). Different batches contained varying water amounts contributed by the benzenesulfonic acid and toluenesulfonic acid ingredients (as measured by azeotrpic extraction with xylene and shown in Table 2). Varying levels of HF and/or acetonitrile were introduced as in Examples 1-10 to level as shown in Table 2. The procedure of Examples 1-10 was followed to determine the aluminum corrosion rates shown in Table 2.

TABLE 2

Aluminum Corrosion Test
Composition of 50% DDBSA, 34% BSA, 12% DDB

| Example No. | HF ppm | An% | H₂O % | Aluminum Corrosion A°/min |
|---|---|---|---|---|
| 11 | 0 | — | 1.3 | 123 |
| 12 | 0 | 0.5 | 1.3 | 74 |
| 13 | 0 | — | 1.1 | 116 |
| 14 | 0 | 0.2 | 1.1 | 97 |
| 15 | 0 | 1.0 | 1.1 | 66 |
| 16 | 5 | — | 1.1 | 122 |
| 17 | 5 | 0.2 | 1.1 | 89 |
| 18 | 15 | — | 1.1 | 106 |
| 19 | 15 | 0.2 | 1.1 | 64 |
| 20 | 50 | — | 1.1 | 7 |
| 21 | 50 | 0.2 | 1.1 | 2 |
| 22 | 50 | 1.0 | 1.1 | 2 |
| 23 | 100 | 1.0 | 1.1 | 1 |
| 24 | 0 | — | 0.7 | 60 |
| 25 | 5 | — | 0.7 | 48 |
| 26 | 5 | 0.2 | 0.7 | 36 |
| 27 | 5 | 0.5 | 0.7 | 28 |
| 28 | 30 | 0.2 | 0.7 | 0.4 |
| 29 | 30 | 0.5 | 0.7 | 0.3 |

EXAMPLES 30-35

A composition was prepared as above, but also containing chlorinated hydrocarbon solvents:

| | |
|---|---|
| dodecylbenzenesulfonic acid | 34 weight % |
| dodecylbenzene | 10 weight % |
| toluenesulfonic acid | 8 weight % |
| orthodichlorobenzene | 28 weight % |
| perchloroethylene | 20 weight % |

The impurity contents and carbon distributions of the first three ingredients were as in Examples 1-29. The same procedure was followed except that titanium foils were used which were 3 inch × 0.625 inch × 0.008 inch. Levels of HF (analyzed by comparison detection with a fluoride specific ion electrode), nitrile (as added) and water were as shown in Table 3. The titanium corrosion rates were calculated to be the values shown in Table 3.

TABLE 3

Titanium Corrosion Test
Composition of 34% DDBSA, 10% DDB, 8% TSA, 28% DDCB, 20% Perc

| Example No. | HF ppm | Nitrile | % | H₂O % | Titanium Corrosion A°/min |
|---|---|---|---|---|---|
| 30 | 50 | None | — | 0.4 | 25 |
| 31 | 50 | BN | 0.2 | 0.4 | 15 |
| 32 | 50 | AN | 0.2 | 0.4 | 15 |
| 33 | 40 | None | — | 0.2 | 7 |
| 34 | 40 | AN | 0.2 | 0.2 | 4 |
| 35 | 40 | AN | 0.6 | 0.2 | 0.4 |

EXAMPLES 36-38

Using the chlorinated hydrocarbon-containing composition of Examples 30-35, HF was added at 150 ppm and acetonitrile at 0%, 0.15% and 0.30%. The composition was then kept in an open beaker at 100° C. for 3¼ hours during which time 15-20 weight % of the total composition was lost to evaporation. This similates repeated use of a stripper. HF levels were then determined by comparison detection to be the levels shown in Table 4 and samples placed in test tubes. The aluminum corrosion rate was then determined as in Examples 1-29.

TABLE 4

Aluminum Corrosion Test
Composition of 34% DDBSA, 10% DDB,
8% TSC, 28% DDCB, 20% Perc

| Example No. | HF ppm | Acetonitrile % | $H_2O$ % | Aluminum Corrosion A°/min |
|---|---|---|---|---|
| 36 | 2 | — | 0.25 | 21 |
| 37 | 7 | 0.15 | 0.25 | 2 |
| 38 | 13 | 0.30 | 0.25 | 0.3 |

In other runs with fluoride containing material, each of the nitriles tested lowered the amount of fluoride lost when the composition was heated to 100° C. for 3¼-3½ hours. Lowered corrosion rates of aluminum were observed where a combination of fluoride and nitrile was present.

EXAMPLES 39-61

A large batch (about 4 kilograms) was prepared of 51 weight % dodecylbenzenesulfonic acid, 33 weight % benzene sulfonic acid, 11 weight % TXA (a Witco Chemical product containing about one half toluenesulfonic acid and one half xylenesulfonic acid, by weight, and a trace of ethylbenzenesulfonic acid) and 5 weight % dodecylbenzene. Ingredients other than TXA were as described for Examples 1-10. This batch was heated to 110° C. for six hours under vacuum to remove excess water. A small aliquot of this batch was determined by azeotropic vacuum distillation with xylene to contain 0.27% water. Water was added to a one kilogram portion of this batch to a level of 0.3% water. The portion as then split into two halves and nitriles (acetonitrile=AN, malononitrile=MN) were added to samples of the first half as indicated in Table 5 for Examples 39-43. Fluoride was added (as a 50:50 mixture of HF and water) to the second half to 20 ppm fluoride, and nitriles were added as indicated for Examples 44-48. Water was added to a second one-kilogram portion to bring it to 0.6% water and then it was split into halves with fluoride added to the second half to 20 ppm and nitriles added to samples of both halves, all as indicated in Table 5 for Examples 49-58. Examples 59 and 60 were prepared from remaining samples of the first one-kilogram portion and adiponitrile (ADN). Example 61 was a blend of various leftovers.

Each sample was then placed in a test tube with weighed aluminum foil strips of 3 inch×1 inch×0.002 inch. The tubes were covered and kept at 100° C. for eighteen hours. Then the foil pieces were rinsed, dried and weighed on an analytical balance. From the difference in weight an aluminum corrosion rate in angstroms per minute was calculated.

TABLE 5

Aluminum Corrosion Test
Composition of 51% DDBSA,
33% BSA, 11% TXA, 5% DDB

| Example No. | Water Wt. % | Fluoride ppm | Nitrile | Weight % | Aluminum Corrosion Rate Angstroms/Min. |
|---|---|---|---|---|---|
| 39 | 0.3 | 0 | — | — | 14.0 |
| 40 | 0.3 | 0 | MN | 0.1 | 8.7 |
| 41 | 0.3 | 0 | MN | 0.2 | 6.6 |
| 42 | 0.3 | 0 | AN | 0.1 | 7.6 |
| 43 | 0.3 | 0 | AN | 0.2 | 5.1 |
| 44 | 0.3 | 20 | — | — | 0.15 |
| 45 | 0.3 | 20 | MN | 0.05 | 0.075 |
| 46 | 0.3 | 20 | MN | 0.1 | 0.075 |
| 47 | 0.3 | 20 | AN | 0.05 | 0.075 |
| 48 | 0.3 | 20 | AN | 0.1 | 0.15 |
| 49 | 0.6 | 0 | — | — | 21.4 |
| 50 | 0.6 | 0 | MN | 0.1 | 30.9 |
| 51 | 0.6 | 0 | MN | 0.2 | 21.0 |
| 52 | 0.6 | 0 | AN | 0.1 | 20.9 |
| 53 | 0.6 | 0 | AN | 0.2 | 19.8 |
| 54 | 0.6 | 20 | — | — | 2.9 |
| 55 | 0.6 | 20 | MN | 0.1 | 0.24 |
| 56 | 0.6 | 20 | MN | 0.2 | 0.16 |
| 57 | 0.6 | 20 | AN | 0.1 | 0.24 |
| 58 | 0.6 | 20 | AN | 0.2 | 0.10 |
| 59 | 0.3 | 0 | ADN | 0.1 | 6.8 |
| 60 | 0.3 | 20 | ADN | 0.1 | 0.075 |
| 61 | 0.5 | 14 | ADN | 0.13 | 0.32 |

EXAMPLES 62-73

To the remainder of the large (4 kilogram) batch of stripper used for Examples 39-61 water was added to achieve 0.6% water. HF and/or the same three nitriles (AN, MN or ADN) were added to ten of eleven samples of this composition to achieve the levels indicated in Table 6 for Examples 63-72. Example 62 was a similar sample without fluoride or nitrile. As indicated in Table 6, four of these compositions were made up to correspond to similar samples used in Examples 49-61.

Each of these strippers was then heated to beakers to 100° C. and held there for one-half hour to simulate use conditions. It should be noted that the original four-kilogram sample (of which these samples were a portion) had been heated to 110° C. for six hours. Failure to heat this stripper may reduce its stripping efficiency. Two-inch diameter silicon wafers coated with a phenol-formaldehyde photoresist (AZ 1350J from Shipley Co., Inc.) baked at 175° C. for 40 minutes were then immersed with single-wafer holders in each beaker at 100° C. for intervals of five or so minutes. The wafers were periodically checked to determine the total stripping time. If a wafer was removed and rinsed and found not to be completely stripped, it was returned to the beaker until an approximate total stripping time was determined. Each total stripping time was confirmed by immersing a fresh coated wafer in the beaker. The results are shown in Table 6. It should be apparent that nitriles at a level of 0.2% had little or no deleterious effect upon the stripping time, but that levels of 0.5% and 1.0% had increasingly significant deleterious effects. Referring back to Table 5, it can be seen that the combination of fluoride and nitrile substantially inhibited corrosion at nitrile levels of 0.1% (Examples 55, 57 and 60) and 0.2% (Examples 56 and 58). As shown by Examples 64, 67 and 70, these low levels of nitrile did not seriously impede the stripping rate.

TABLE 6

Stripping Test
Composition of 51% DDBSA, 33% BSA, 11% TXA, 5% DDB
AZ 1340J Positive Photoresist
Baked at 175° C. for 40 Minutes

| Example No. | Corresp. Example | Water Weight | Fluoride ppm | Nitrile | Wt. % | Stripping Time |
|---|---|---|---|---|---|---|
| 62 | 49 | 0.6% | 0 | — | — | 5 min. |
| 63 | 54 | 0.6% | 20 | — | — | 5 |
| 64 | 56 | 0.6% | 20 | MN | 0.2 | 5 |
| 65 | — | 0.6% | 20 | MN | 0.5 | 30 |
| 66 | — | 0.6% | 20 | MN | 1.0 | 75 |
| 67 | 58 | 0.6% | 20 | AN | 0.2 | 5 |
| 68 | — | 0.6% | 20 | AN | 0.5 | 55 |
| 69 | — | 0.6% | 20 | AN | 1.0 | 90 |
| 70 | — | 0.6% | 20 | ADN | 0.2 | 5 |
| 71 | — | 0.6% | 20 | ADN | 0.5 | 15 |
| 72 | — | 0.6% | 20 | ADN | 1.0 | 50 |

What is claimed is:

1. An improved organic stripping composition for removing polymeric organic substances from metallized inorganic substrates comprising at least one organic sulfonic acid of the formula R—$SO_3$H where R is an organic radical selected from the group consisting of alkyl containing 1 to 18 carbon atoms, monohydroxyalkyl containing 1 to 18 carbon atoms, aryl containing 6 to 10 carbon atoms, monoalkylaryl wherein the alkyl group contains 1 to 14 carbon atoms, dialkylaryl wherein each alkyl group contains 1 to 4 carbon atoms, monohydroxyaryl containing 6 to 10 carbon atoms, monoalkyl-hydroxyaryl containing 7 to 11 carbon atoms and monochloro-hydroxyaryl containing 6 to 10 carbon atoms, optionally at least one organic solvent and an inhibitor system including about 5 to about 300 ppm by weight of fluoride by weight of composition, the improvement wherein the inhibitor system also includes about 0.01 to about 5% percent by weight of composition of a nitrile compound of the formula H—R—CN or of the formula NC—R—CN, where R is alkylene, arylene or alkylarylene.

2. The stripping composition of claim 1 comprising between about 0.05 and about 1 weight percent nitrile compound.

3. The stripping composition of claim 2 comprising between about 0.1 and about 0.3 weight percent nitrile compound.

4. The stripping composition of claim 1 containing between about 0.01 and about 0.5 weight percent nitrile compound.

5. The stripping composition of claim 4 containing between about 0.05 and about 0.3 weight percent nitrile compound.

6. The composition of claim 1 wherein said nitrile compound is acetonitrile.

7. The stripping composition of claim 1 wherein said nitrile compound is malonitrile.

8. The stripping composition of claim 1 wherein said nitrile compound is adiponitrile.

9. The stripping composition of claim 1 being free of phenolic compounds.

10. The stripping composition of claim 9 wherein said organic solvent includes chlorinated hydrocarbon compounds.

11. The stripping composition of claim 9 being free of chlorinated hydrocarbon compounds.

12. The stripping composition of claim 1 wherein said sulfonic acid includes, as the predominant stripping agent, at least one sulfonic acid selected from the group consisting of benzene sulfonic acid, toluene sulfonic acid, cumene sulfonic acid, decylbenzene sulfonic acid and dodecylbenzene sulfonic acid.

13. A method of stripping a polymeric organic substance from a metallized inorganic substrate comprising contacting the polymeric organic substance with the stripping composition of any of claims 2, 4, 6, 7, 8, 9 or 11 at a temperature of about 20° to about 180° C.

14. The method of claim 13 wherein said polymeric organic substance is a photoresist which comprises a polymer selected from the group consisting of polyisoprene, polyvinylcinnamate and phenol-formaldehyde resins, and wherein the inorganic substrate is silicon with a silicon dioxide coating.

15. A method of stripping a polymeric organic substance selected from the group consisting of polyisoprene, polyvinylcinnamate and phenol formaldehyde resins from a metallized inorganic substrate comprising contacting the polymeric organic substance with the stripping composition of claim 1.

16. The method of claim 15 wherein the inorganic substrate is covered with a pattern of aluminum.

17. The method of claim 15 wherein the inorganic substrate is covered with a pattern of titanium.

18. The method of claim 15 wherein the polymeric organic substance is a phenol-formaldehyde resin and the stripping composition contains between about 0.01 and about 0.5 weight percent nitrile.

19. The method of claim 18 wherein the stripping composition contains between about 0.05 and about 0.3 weight percent nitrile.

20. The method of claim 18 wherein the polymeric organic substance has been baked on the substrate at a temperature between about 120° C. and about 180° C.

* * * * *